United States Patent
Hill et al.

(10) Patent No.: US 10,656,038 B2
(45) Date of Patent: May 19, 2020

(54) APPARATUS, SYSTEM, AND METHOD FOR USE IN FLUID FILLING APPARATUS INSPECTION

(71) Applicant: Honda Motor Co., Ltd., Tokyo (JP)

(72) Inventors: Robert Lee Hill, Odenville, AL (US); James Allen Reeves, Pell City, AL (US)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 16/048,717

(22) Filed: Jul. 30, 2018

(65) Prior Publication Data
US 2020/0033213 A1 Jan. 30, 2020

(51) Int. Cl.
*G01L 27/00* (2006.01)
*G01L 15/00* (2006.01)
*B60T 17/22* (2006.01)

(52) U.S. Cl.
CPC ............ *G01L 15/00* (2013.01); *B60T 17/222* (2013.01)

(58) Field of Classification Search
CPC ........... G01F 25/0038; G01L 27/00–02; G01L 15/00; B60T 17/222; G01M 99/00; G01M 99/005; G01M 99/008
USPC .............................................. 73/37, 39, 49.7
See application file for complete search history.

(56) References Cited

U.S. PATENT DOCUMENTS

| | | | | |
|---|---|---|---|---|
| 1,825,013 A | * | 9/1931 | Patton ................... | B60T 17/222 188/352 |
| 2,295,539 A | * | 9/1942 | Beach ................... | B60T 17/222 188/352 |
| 2,509,570 A | * | 5/1950 | Warden ................. | B60T 17/222 222/23 |
| 3,125,879 A | * | 3/1964 | Porter, Jr. ........... | G01F 25/0053 73/1.19 |
| 3,216,622 A | * | 11/1965 | Drostholm .............. | G01F 13/00 222/135 |
| 3,339,401 A | * | 9/1967 | Peters .................... | B60T 17/222 73/40.5 R |

(Continued)

FOREIGN PATENT DOCUMENTS

CN 201207007 Y * 3/2009
CN 209602076 U * 11/2019
(Continued)

OTHER PUBLICATIONS

English Translation of CN 201207007 (2009).*
English Translation of CN 209602076 (2019).*

*Primary Examiner* — Alexander A Mercado
(74) *Attorney, Agent, or Firm* — Armstrong Teasdale LLP

(57) ABSTRACT

A brake fill test apparatus that includes a vessel including an interior having a fill chamber, a first sensor chamber, and a second sensor chamber. The vessel also includes at least one port that provides access to the fill chamber. A first valve is configured to provide selective flow communication between the fill chamber and the first sensor chamber, and a second valve is configured to provide selective flow communication between the fill chamber and the second sensor chamber. A first sensor is coupled within the first sensor chamber and a second sensor is coupled within the second sensor chamber. The first sensor is configured to monitor a positive gauge pressure within the interior and the second sensor is configured to monitor a negative gauge pressure within the interior.

20 Claims, 4 Drawing Sheets

(56) References Cited

U.S. PATENT DOCUMENTS

| | | | | |
|---|---|---|---|---|
| 3,425,464 A * | 2/1969 | Hughes | .................... | F01P 11/02 141/7 |
| 3,548,978 A * | 12/1970 | Dyke | .................... | B60T 17/222 188/352 |
| 3,638,485 A * | 2/1972 | Knauth | .................... | E21B 21/08 73/152.19 |
| 3,696,659 A * | 10/1972 | Lawford | .................... | G01L 13/023 73/1.69 |
| 3,939,688 A * | 2/1976 | Misch | .................... | G01F 25/0038 73/1.31 |
| 4,006,762 A * | 2/1977 | Badger | .................... | B67D 7/362 141/198 |
| 4,017,329 A * | 4/1977 | Larson | .................... | B60T 17/222 134/21 |
| 4,165,819 A * | 8/1979 | Zivkovic | .................... | B60T 17/222 222/207 |
| 4,415,071 A * | 11/1983 | Butler | .................... | B60T 17/222 188/352 |
| 4,509,802 A * | 4/1985 | Solleder | .................... | B60T 8/175 180/197 |
| 4,708,010 A * | 11/1987 | Sgourakes | .................... | G01L 27/005 73/1.61 |
| 4,899,574 A * | 2/1990 | Potteiger | .................... | G01M 3/363 73/49.3 |
| 5,060,703 A * | 10/1991 | Koerner | .................... | B60T 17/222 141/59 |
| 5,088,529 A * | 2/1992 | Jones | .................... | B60T 17/222 141/59 |
| 5,361,624 A | 11/1994 | Lambert et al. | | |
| 5,641,003 A * | 6/1997 | Rey | .................... | F15B 21/005 141/1 |
| 5,653,316 A * | 8/1997 | Kane | .................... | B60T 17/222 188/352 |
| 5,694,808 A * | 12/1997 | Weis | .................... | B60T 8/90 73/168 |
| 5,767,389 A * | 6/1998 | LaFountain | .................... | F15B 19/00 73/39 |
| 5,787,372 A * | 7/1998 | Edwards | .................... | F16N 39/00 184/1.5 |
| 5,944,068 A * | 8/1999 | Hool | .................... | B60T 17/222 141/65 |
| 5,964,326 A * | 10/1999 | Lee | .................... | B60T 17/222 188/352 |
| 6,179,392 B1 * | 1/2001 | Baechle | .................... | B60T 8/34 141/98 |
| 6,206,055 B1 * | 3/2001 | Hollub | .................... | B60T 17/222 141/65 |
| 6,302,167 B1 * | 10/2001 | Hollub | .................... | B60T 17/221 141/65 |
| 6,443,192 B1 | 9/2002 | Erwin et al. | | |
| 6,530,264 B1 * | 3/2003 | Rink | .................... | G01M 3/227 73/40.7 |
| 6,796,339 B1 * | 9/2004 | Petty | .................... | B60T 17/222 141/59 |
| 6,929,036 B2 * | 8/2005 | Awad | .................... | B60T 17/222 141/59 |
| 7,152,636 B2 * | 12/2006 | Petty | .................... | B60T 17/222 141/65 |
| 8,215,343 B2 * | 7/2012 | Murphy | .................... | B60T 17/222 141/192 |
| 8,464,763 B2 * | 6/2013 | Petty | .................... | B60T 17/222 141/65 |
| 8,955,561 B2 * | 2/2015 | Mitrovich | .................... | B65B 3/04 141/198 |
| 9,260,988 B2 * | 2/2016 | Lin | .................... | F01M 11/0458 |
| 2003/0037837 A1 * | 2/2003 | Erwin | .................... | B60T 17/222 141/65 |
| 2004/0089371 A1 * | 5/2004 | Few | .................... | B60S 5/00 141/98 |
| 2004/0123641 A1 * | 7/2004 | Gilbert | .................... | G01D 3/08 73/1.02 |
| 2004/0173005 A1 * | 9/2004 | Martone | .................... | G01M 3/3236 73/40 |
| 2007/0210646 A1 * | 9/2007 | Valle | .................... | F15B 21/005 303/114.1 |
| 2007/0289827 A1 * | 12/2007 | Isono | .................... | B60T 8/38 188/358 |
| 2008/0060421 A1 * | 3/2008 | Muller | .................... | G01M 3/229 73/49.2 |
| 2008/0307858 A1 * | 12/2008 | McManus | .................... | G01M 3/226 73/40.7 |
| 2011/0253252 A1 * | 10/2011 | Buchanan | .................... | B60T 17/222 141/11 |
| 2012/0247615 A1 * | 10/2012 | Ogerly | .................... | B60T 17/222 141/311 R |
| 2015/0226628 A1 * | 8/2015 | Stering | .................... | G01L 27/005 73/1.63 |
| 2017/0102015 A1 * | 4/2017 | Sapienza | .................... | F15B 19/00 |
| 2017/0167939 A1 * | 6/2017 | Kastelein | .................... | G01L 27/005 |
| 2018/0010599 A1 * | 1/2018 | Hernandez Martinez | .................... | B41J 2/175 |
| 2018/0017460 A1 * | 1/2018 | Batista | .................... | G01L 27/005 |
| 2020/0009311 A1 * | 1/2020 | Wilcox | .................... | G01M 3/2869 |
| 2020/0031328 A1 * | 1/2020 | Hill | .................... | B60T 17/222 |

FOREIGN PATENT DOCUMENTS

| | | | | |
|---|---|---|---|---|
| DE | 102005052640 B3 | 2/2007 | | |
| WO | WO-9002083 A1 * | 3/1990 | ............ | B60T 17/222 |

* cited by examiner

APPARATUS, SYSTEM, AND METHOD FOR USE IN FLUID FILLING APPARATUS INSPECTION

BACKGROUND

The field of the present disclosure relates generally to fluid systems in a vehicle and, more specifically, to systems and methods of inspecting a brake fluid filling apparatus.

A known process step in the manufacture of motor vehicles includes adding fluids to hydraulic, cooling, and lubricating systems of the vehicle. For example, fluids must be added to the engine, transmission, steering system, cooling system, and brake system of the vehicle to enable the vehicle to operate properly. Vehicle fluid filling operations may be performed with an automated or robotic filling tool, which facilitates filling the various systems with the proper amount of fluid in a rapid and repeatable manner. In at least some known filling operations, such as those in which brake fluid is introduced into the brake system, air must be removed from the brake system before brake fluid is introduced therein to facilitate improving the responsiveness of the brakes in the vehicle. However, if malfunctions occur during the air removal or fluid filling cycles, it may be difficult to determine the source of the malfunctions.

BRIEF DESCRIPTION

In one aspect, a brake fill test apparatus is provided. The apparatus includes a vessel including an interior having a fill chamber, a first sensor chamber, and a second sensor chamber. The vessel also includes at least one port that provides access to the fill chamber. A first valve is configured to provide selective flow communication between the fill chamber and the first sensor chamber, and a second valve is configured to provide selective flow communication between the fill chamber and the second sensor chamber. A first sensor is coupled within the first sensor chamber and a second sensor is coupled within the second sensor chamber. The first sensor is configured to monitor a positive gauge pressure within the interior and the second sensor is configured to monitor a negative gauge pressure within the interior.

In another aspect, a brake fill test system is provided. The system includes a filling apparatus and a vessel including an interior having a fill chamber, a first sensor chamber, and a second sensor chamber. The vessel also includes at least one port that provides access to the fill chamber. The at least one port and the filling apparatus are configured to mate with a sealing engagement, and the filling apparatus is configured to pressurize the interior when the sealing engagement is formed. A first valve is configured to provide selective flow communication between the fill chamber and the first sensor chamber, and a second valve is configured to provide selective flow communication between the fill chamber and the second sensor chamber. A first sensor is coupled within the first sensor chamber and a second sensor is coupled within the second sensor chamber. The first sensor is configured to monitor a positive gauge pressure within the interior and the second sensor is configured to monitor a negative gauge pressure within the interior.

In yet another aspect, a method of inspecting a brake fluid filling apparatus is provided. The method includes mating the brake fluid filling apparatus with at least one port of a vessel, wherein the vessel includes an interior comprising a fill chamber, a first sensor chamber, and a second sensor chamber, and providing selective flow communication between the fill chamber and the first sensor chamber, or between the fill chamber and the second sensor chamber. The method also includes pressurizing the interior with the brake fluid filling apparatus, and monitoring a gauge pressure within the interior with a first sensor coupled within the first sensor chamber and with a second sensor coupled within the second sensor chamber.

DETAILED DESCRIPTION

The embodiments described herein relate generally to systems and methods of inspecting a brake fluid filling apparatus. More specifically, the system described herein includes a test vessel designed to simulate a fluid reservoir of a motor vehicle as a form of control for the brake fluid filling apparatus. For example, the test vessel has an interior sized to simulate a known volume of a brake fluid system, and the test vessel has side walls that are resistant to deformation when the interior is pressurized by the brake fluid filling apparatus. During an inspection operation, the brake fluid filling apparatus mates with the test vessel as though it is performing a normal fluid filling operation on a brake system of a motor vehicle.

During normal fluid filling operations, typically a vacuum cycle is performed to remove air from the brake fluid system, and a filling cycle is then performed to fill the brake fluid system with a predetermined volume of fluid. In the example embodiment, the test vessel includes at least one sensor coupled thereto for monitoring the gauge pressure within the interior of the test vessel. The pressure readings obtained by the sensor are then compared to pressure readings obtained by a sensor associated with the brake fluid filling apparatus. Thus, the test vessel enables an operator of the brake fluid filling apparatus to verify if the apparatus is functioning within normal parameters.

Figure 1:
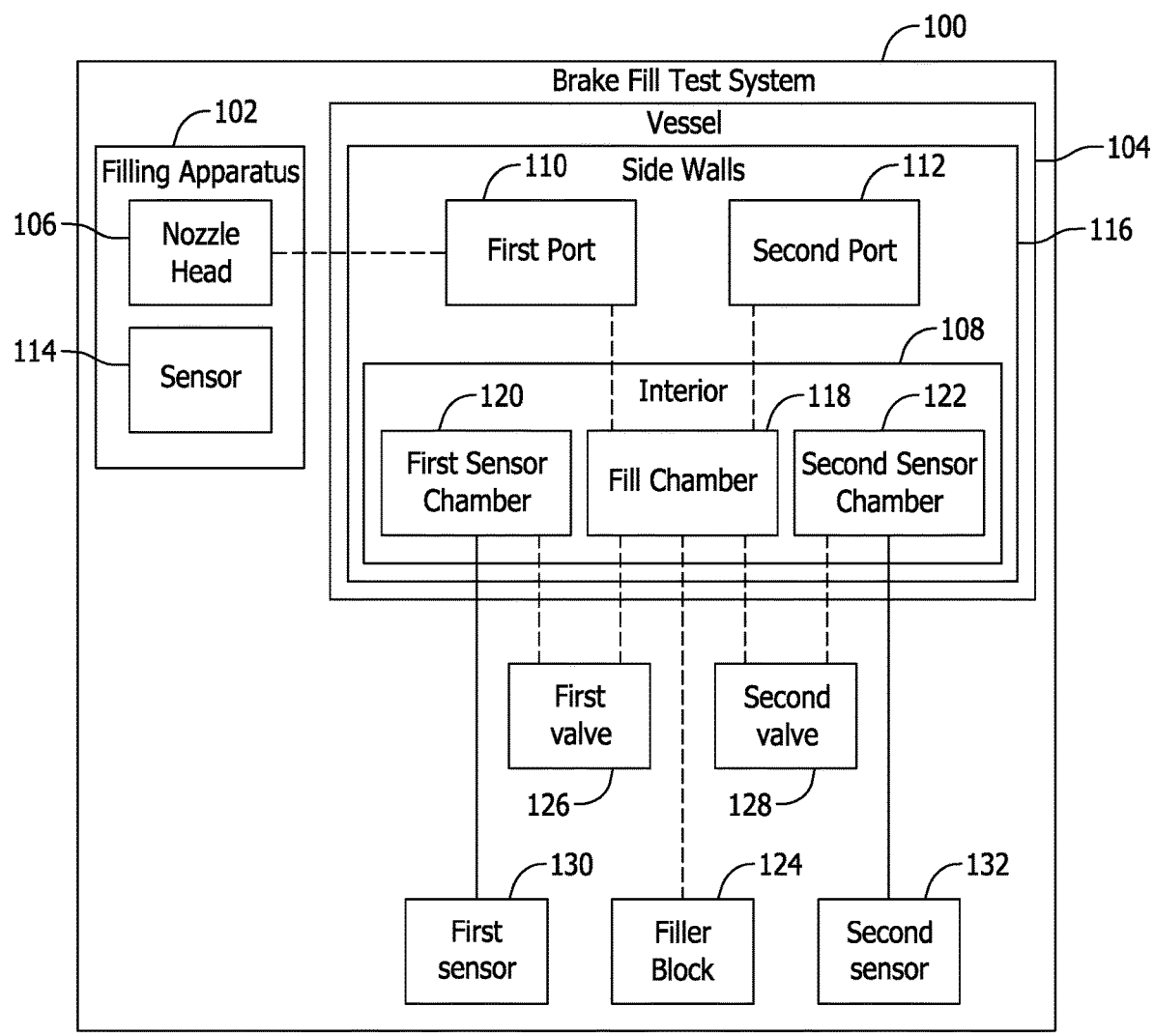
FIG. 1 is a block diagram of an exemplary brake fill test system.

FIG. 1 is a block diagram of an exemplary brake fill test system 100. In the exemplary embodiment, brake fill test system 100 includes a filling apparatus 102 and a vessel 104 in selective flow communication with filling apparatus 102. Filling apparatus 102 includes a nozzle head 106. Moreover, vessel 104 includes an interior 108, and a first port 110 and a second port 112 that provide access to interior 108. First port 110 is oriented to channel fluid into interior 108 and second port 112 is oriented to discharge the fluid from interior 108. Thus, selective flow communication is provided between filling apparatus 102 and vessel 104 when nozzle head 106 mates with first port 110 of vessel 104.

In one embodiment, nozzle head 106 substantially seals first port 110 with an air tight interface when mated therewith. Second port 112 is also sealed with an air tight interface to facilitate sealing interior 108 when filling apparatus 102 performs a fluid filling operation. As will be explained in more detail below, the fluid filling operation includes performance of a vacuum cycle followed by performance of a fill cycle. Thus, filling apparatus 102 may be any device that enables brake fill test system 100 to function as described herein. In the exemplary embodiment, filling apparatus 102 is an automated or robotic device that is capable of performing both the vacuum cycle and the fill cycle. Filling apparatus 102 also includes a sensor 114 for use in monitoring either a positive gauge pressure or a negative gauge pressure applied to interior 108 of vessel 104 during the vacuum cycle and the fill cycle. In some embodiments, malfunctions in one or more components of filling apparatus 102 may result in sensor 114 providing inaccurate gauge pressure readings.

In the exemplary embodiment, vessel 104 includes a plurality of side walls 116 that define interior 108, which includes a fill chamber 118, a first sensor chamber 120, and a second sensor chamber 122. Fill chamber 118 is sized to simulate a known volume of a brake fluid system of a vehicle. For example, in one embodiment, fill chamber 118 has a fixed volume equal to about one liter, which may be oversized relative to a known volume of a brake fluid system of a vehicle. In instances where a brake fluid system has a volume of less than about one liter, brake fill test system 100 further includes a filler block 124 that is selectively positionable within fill chamber 118. Filler block 124 may have any size that enables vessel 104 to function as described herein and, in one embodiment, is sized to reduce the volume of fill chamber 118 by a predetermined amount. For example, brake fluid systems in different vehicles may have different volumetric capacities, and the size of filler block 124 is selected to reduce the volume of fill chamber 118 to substantially match the different volumetric capacities. In the exemplary embodiment, filler block 124 is sized for insertion through at least one of first port 110 or second port 112.

Brake fill test system 100 includes a first valve 126 positioned between fill chamber 118 and first sensor chamber 120, and a second valve 128 positioned between fill chamber 118 and second sensor chamber 122. First valve 126 is actuatable to provide selective flow communication between fill chamber 118 and first sensor chamber 120, and second valve 128 is actuatable to provide selective flow communication between fill chamber 118 and second sensor chamber 122. In operation, first valve 126 and second valve 128 are each selectively operable to provide flow communication between fill chamber 118 and only one of first sensor chamber 120 or second sensor chamber 122 at a time.

More specifically, brake fill test system 100 further includes a first sensor 130 and a second sensor 132. First sensor 130 is coupled within first sensor chamber 120, and second sensor 132 is coupled within second sensor chamber 122. First sensor 130 monitors a positive gauge pressure within interior 108, and second sensor 132 monitors a negative gauge pressure within interior 108. As such, pressure readings from within interior 108 are obtained independent of those obtained by sensor 114 of filling apparatus 102

In operation, as described above, filling apparatus 102 performs a fluid filling operation, which includes performance of a vacuum cycle followed by performance of a fill cycle. Prior to performance of the vacuum cycle, first valve 126 is actuated into a closed position to seal first sensor chamber 120 from fill chamber 118, and second valve 128 is actuated into an open position to provide flow communication between fill chamber 118 and second sensor chamber 122. Filling apparatus 102 then performs the vacuum cycle to remove air from interior 108 as second sensor 132 monitors the negative gauge pressure within interior 108. In the exemplary embodiment, the gauge pressure value(s) obtained by second sensor 132 are recorded and compared to the gauge pressure value(s) obtained by sensor 114 of filling apparatus 102. Differences in the gauge pressure value(s) may provide an indication that one or more components of filling apparatus 102 have malfunctioned.

In some embodiments, filling apparatus 102 removes the air from interior 108 and then holds first port 110 under seal for a predetermined duration before performing the fill cycle. Second sensor 132 continues to monitor the gauge pressure within interior 108 over the predetermined duration, and facilitates determining variations in the gauge pressure. Variations in the gauge pressure (e.g., a decrease in an absolute gauge pressure value) over the predetermined duration may also provide an indication that one or more components of filling apparatus 102 have malfunctioned.

After the vacuum cycle is complete, first valve 126 is actuated into an open position to provide flow communication between first sensor chamber 120 and fill chamber 118, and second valve 128 is actuated into a closed position to seal fill chamber 118 from second sensor chamber 122. Filling apparatus 102 then performs the fill cycle to fill interior 108 with a predetermined volume of fluid, such as brake fluid, as first sensor 130 monitors the positive gauge pressure within interior 108. In the exemplary embodiment, the gauge pressure value(s) obtained by first sensor 130 are recorded and compared to the gauge pressure value(s) obtained by sensor 114 of filling apparatus 102. Differences in the gauge pressure value(s) may provide an indication that one or more components of filling apparatus 102 have malfunctioned.

In addition, in the exemplary embodiment, side walls 116 of vessel 104 are capable of withstanding deformation when interior 108 is pressurized during the vacuum cycle and the fill cycle. For example, the material used to fabricate the plurality of side walls 116 is selected to withstand deformation when an absolute gauge pressure value within interior 108 is less than a predetermined value. An example pressure range typically experienced during the filling cycle is defined within a range between about 0 pounds per square inch (psi) and about 100 psi, and an example range typically experienced during the vacuum cycle is defined within a range between about 0.05 Torr and about 20 Torr. Under normal working conditions the vacuum can reach as low as 0.12 Torr and the specification for fill pressure is 57 psi. As such, side walls 116 withstand deformation to facilitate ensuring the accuracy of pressure readings obtained by first sensor 130 and second sensor 132 during the vacuum and fill cycles.

In FIG. 1, referred to above, solid lines, if any, connecting various elements and/or components may represent mechanical, electrical, fluid, optical, electromagnetic and other couplings and/or combinations thereof. Dashed lines, if any, connecting the various elements and/or components represent couplings similar in function and purpose to those represented by solid lines; however, couplings represented by the dashed lines may either be selectively provided or may relate to alternative or optional examples of the present disclosure.

Figure 2:
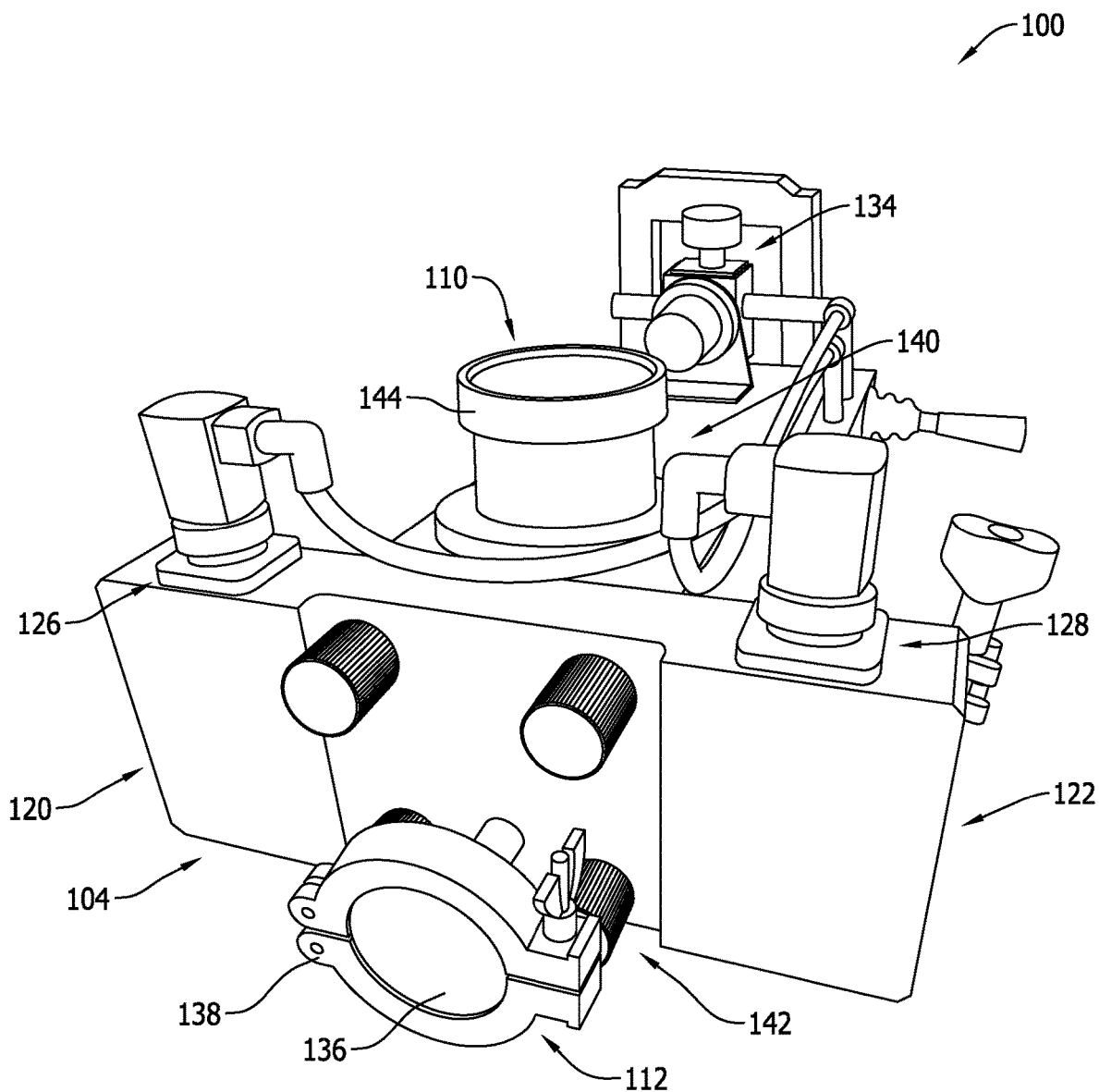
FIG. 2 is a perspective view illustration of the brake fill test system shown in FIG. 1.
Figure 3:
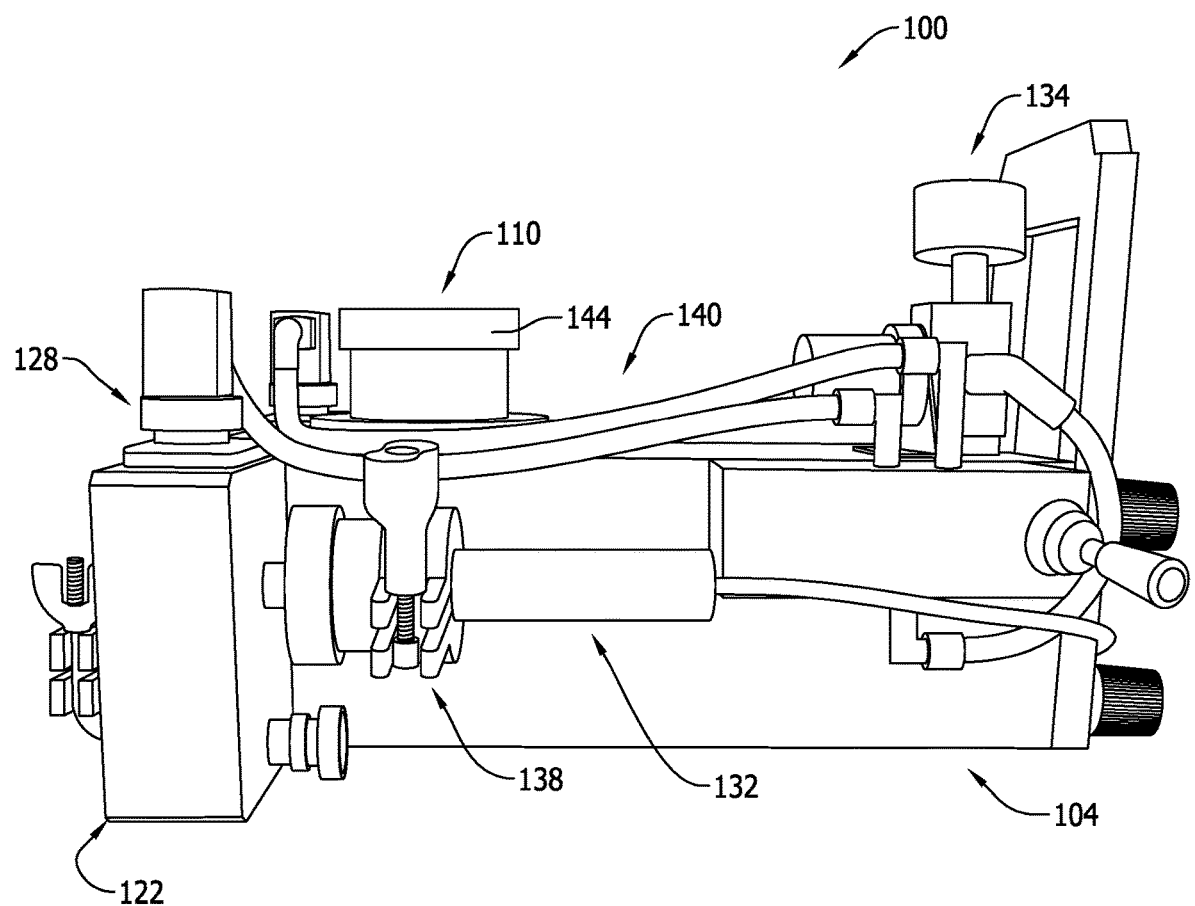
FIG. 3 is a first side view of the brake fill test system shown in FIG. 2.
Figure 4:
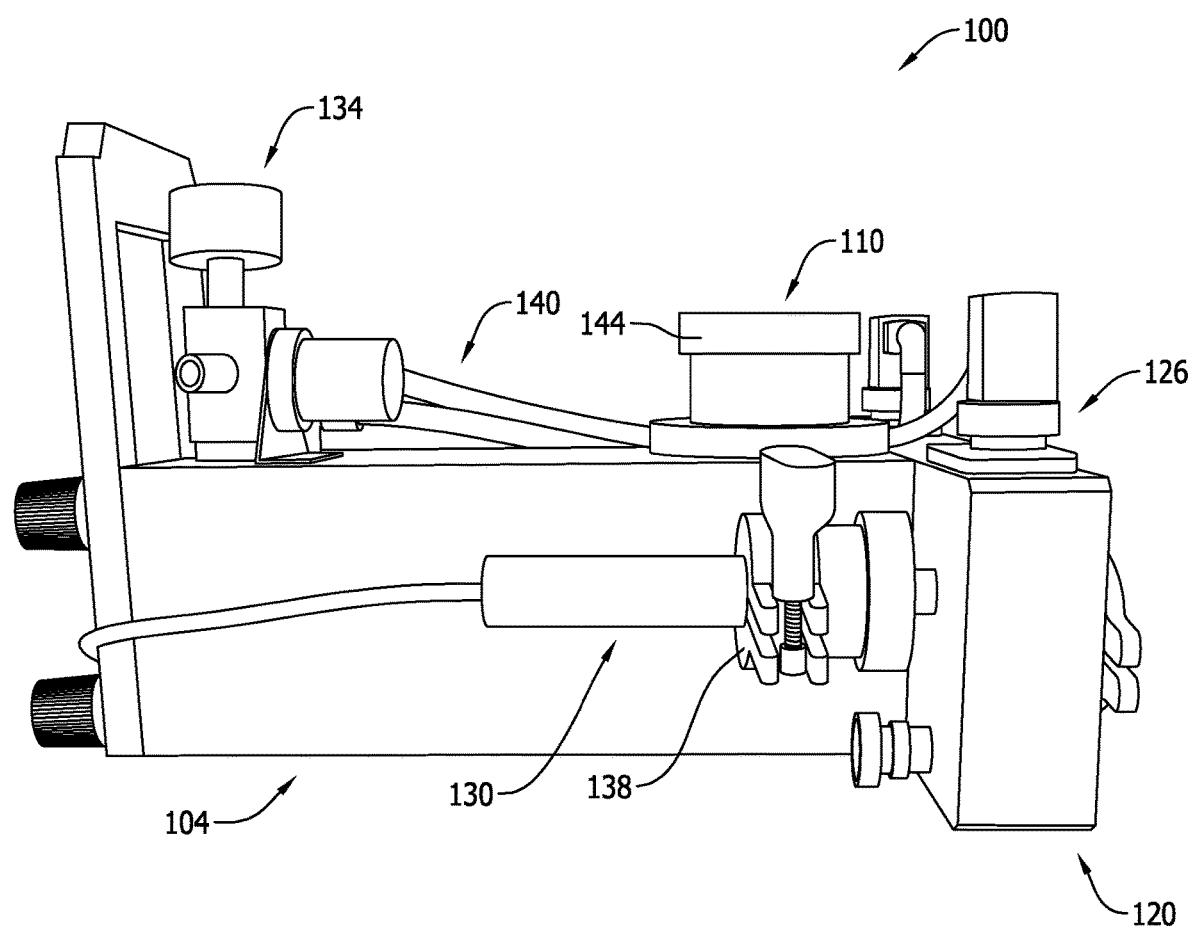
FIG. 4 is a second side view of the brake fill test system shown in FIG. 2.

FIGS. 2-4 are views of brake fill test system 100. In the exemplary embodiment, brake fill test system 100 includes an actuator 134 (e.g., an air pressure regulator) coupled to vessel 104 and in flow communication with first valve 126 and second valve 128. Actuator 134 controls actuation of first valve 126 and second valve 128 pneumatically. Alternatively, actuator 134 controls actuation of first valve 126 and second valve 128 via any means, such as electrical or mechanical means, that enables brake fill test system 100 to function as described herein.

In the exemplary embodiment, first sensor 130 and second sensor 132 are removably coupleable from vessel 104 at first sensor chamber 120 and second sensor chamber 122. In addition, second port 112 of vessel 104 is sealed by a cover 136 that is also removably coupleable from vessel 104. First sensor 130, second sensor 132, and cover 136 are removably coupleable from vessel 104 with a vacuum flange 138. Vacuum flanges 138 facilitate sealing openings in vessel 104 with an air tight interface.

As noted above, first port 110 is oriented to channel fluid into interior 108 (shown in FIG. 1) and second port 112 is oriented to discharge the fluid from interior 108. In the exemplary embodiment, first port 110 is positioned at a top portion 140 of vessel 104, and second port 112 is positioned at a bottom portion 142 of vessel 104. As such, fluid within in interior 108 is capable of being gravity drained through second port 112. In addition, first port 110 is fitted with a flanged opening 144, which enables first port 110 to mate with filling apparatus 102 (shown in FIG. 1) with a sealing engagement.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A brake fill test apparatus comprising:
   a vessel comprising:
      an interior comprising a fill chamber, a first sensor chamber, and a second sensor chamber; and
      at least one port that provides access to said fill chamber;
   a first valve configured to provide selective flow communication between said fill chamber and said first sensor chamber, and a second valve configured to provide selective flow communication between said fill chamber and said second sensor chamber; and
   a first sensor fluidically coupled with said first sensor chamber and a second sensor fluidically coupled with said second sensor chamber, said first sensor configured to monitor a positive gauge pressure within said interior and said second sensor configured to monitor a negative gauge pressure within said interior.

2. The apparatus in accordance with claim 1, wherein said at least one port comprises a first port and a second port, said first port oriented to channel fluid into said interior and said second port oriented to discharge the fluid from said interior.

3. The apparatus in accordance with claim 1, wherein said at least one port is configured to be sealed with an air tight interface.

4. The apparatus in accordance with claim 1, wherein said fill chamber is sized to simulate a known volume of a brake fluid system of a vehicle.

5. The apparatus in accordance with claim 4, wherein said fill chamber has a volume of one liter.

6. The apparatus in accordance with claim 4 further comprising a filler block positionable within said fill chamber, said filler block sized to reduce a volume of said fill chamber by a predetermined amount.

7. The apparatus in accordance with claim 1 further comprising an actuator in communication with said first valve and said second valve, wherein said actuator is configured to control actuation of said first valve and said second valve.

8. The apparatus in accordance with claim 1, wherein said vessel further comprises a plurality of side walls that define said interior, wherein said plurality of side walls are configured to withstand deformation when an absolute gauge pressure value within said interior is less than a predetermined value.

9. A brake fill test system comprising:
   a filling apparatus;
   a vessel comprising:
      an interior comprising a fill chamber, a first sensor chamber, and a second sensor chamber; and
      at least one port that provides access to said fill chamber, wherein said at least one port and said filling apparatus are configured to mate with a sealing engagement, and wherein said filling apparatus is configured to pressurize said interior when the sealing engagement is formed;
   a first valve configured to provide selective flow communication between said fill chamber and said first sensor chamber, and a second valve configured to provide selective flow communication between said fill chamber and said second sensor chamber; and
   a first sensor fluidically coupled with said first sensor chamber and a second sensor fluidically coupled with said second sensor chamber, said first sensor configured to monitor a positive gauge pressure within said interior and said second sensor configured to monitor a negative gauge pressure within said interior.

10. The system in accordance with claim 9, wherein said filling apparatus is configured to form a vacuum within said fill chamber, and is configured to fill said fill chamber with a predetermined volume of fluid after the vacuum is formed.

11. The system in accordance with claim 9, wherein said at least one port comprises a first port and a second port, said first port oriented to channel fluid into said interior and said second port oriented to discharge the fluid from said interior.

12. The system in accordance with claim 11, wherein said filling apparatus comprises a nozzle head configured to seal said first port with an air tight interface.

13. The system in accordance with claim 9, wherein said fill chamber is sized to simulate a known volume of a brake fluid system of a vehicle.

14. The system in accordance with claim 13, wherein said fill chamber has a volume of one liter.

15. A method of inspecting a brake fluid filling apparatus, said method comprising:
   mating the brake fluid filling apparatus with at least one port of a vessel, wherein the vessel includes an interior comprising a fill chamber, a first sensor chamber, and a second sensor chamber;
   providing selective flow communication between the fill chamber and the first sensor chamber;
   providing selective flow communication between the fill chamber and the second sensor chamber;
   pressurizing the interior with the brake fluid filling apparatus;
   monitoring a positive gauge pressure within the interior with a first sensor fluidically coupled with the first sensor chamber; and
   monitoring a negative gauge pressure within the interior with a second sensor fluidically coupled with the second sensor chamber.

16. The method in accordance with claim 15 further comprising holding the at least one port under seal for a predetermined duration, wherein monitoring the positive and negative gauge pressures comprises determining variations in the positive and negative gauge pressures over the predetermined duration.

17. The method in accordance with claim 15, wherein pressurizing the interior comprises using the brake fluid filling apparatus to pressurize the interior over one of a fill cycle or a vacuum cycle, wherein monitoring the positive and negative gauge pressures comprises determining if the positive or negative gauge pressure within the interior reaches a predetermined threshold after the fill cycle or the vacuum cycle is complete.

18. The method in accordance with claim 17, wherein providing selective flow communication comprises:
 providing flow communication only between the fill chamber and the first sensor chamber during the fill cycle; and
 providing flow communication only between the fill chamber and the second sensor chamber during the vacuum cycle.

19. The method in accordance with claim 15 further comprising:
 monitoring a gauge pressure within the interior with a third sensor associated with the brake fluid filling apparatus; and
 comparing a gauge pressure value obtained by the first sensor or the second sensor to a gauge pressure value obtained by the third sensor.

20. The method in accordance with claim 19, wherein pressurizing the interior comprises:
 forming a vacuum within the interior; and
 filling the fill chamber with a predetermined volume of fluid after the vacuum is formed.

* * * * *